United States Patent [19]
Konishi et al.

[11] Patent Number: 5,644,481
[45] Date of Patent: Jul. 1, 1997

[54] CONTROLLED DC VOLTAGE STABILIZER

[75] Inventors: Hirofumi Konishi, Takatshuki; Masanori Yamanaka, Takatsuki, both of Japan

[73] Assignee: Matsushita Electric Industrial Co., Ltd., Osaka, Japan

[21] Appl. No.: 547,053

[22] Filed: Oct. 23, 1995

[30] Foreign Application Priority Data

Nov. 15, 1994 [JP] Japan .................................. 6-280561

[51] Int. Cl.$^6$ .................................................. H02M 3/335
[52] U.S. Cl. .................................................. 363/21
[58] Field of Search .......................... 363/16, 21, 25, 363/26

[56] References Cited

U.S. PATENT DOCUMENTS

| | | |
|---|---|---|
| 3,913,001 | 10/1975 | Kayama ........................... 321/2 |
| 4,847,742 | 7/1989 | Ohashi et al. ..................... 363/21 |
| 4,849,869 | 7/1989 | Tanuma et al. .................... 363/21 |

*Primary Examiner*—Aditya Krishnan
*Attorney, Agent, or Firm*—Ratner & Prestia

[57] ABSTRACT

A current source circuit is contained in an output control IC and amplifies a feedback current produced by a photocoupler by 7 to 10 times. The current amplifier has an adequate current amplification factor and is composed of an IC. A capacitor connected to the oscillator is charged by a current amplified at the current amplifier and a period of the output of the oscillator is controlled by the charging current. A conductive period of the switching device connected to the oscillator through a driver is also controlled. Accordingly, the amount of energy supplied to the secondary side of the switching transformer is also controlled and a stable secondary dc output voltage is produced. A stable voltage control is obtained over a wide range of loads, from a light load to a heavy load. Because the current amplification factor is stable against an environmental temperature condition and has little variation, there is no abnormal oscillation of the power source circuit due to a ripple component included in the secondary dc output voltage and a stable controlled dc voltage stabilizer can be realized.

3 Claims, 3 Drawing Sheets

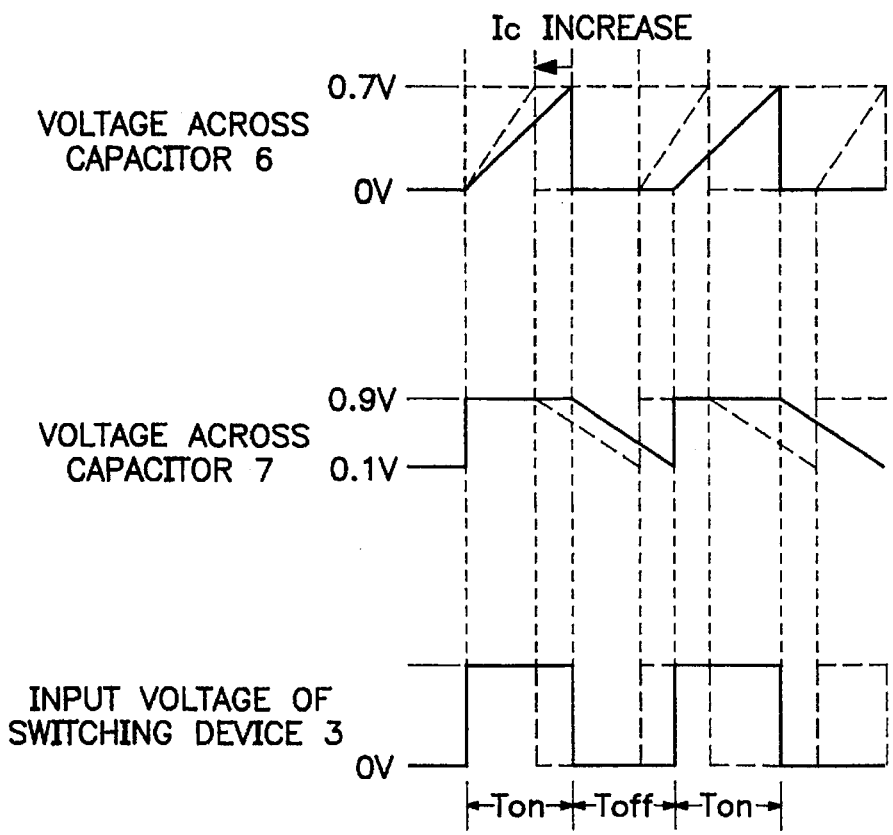
FIG. 2A
FIG. 2B
FIG. 2C
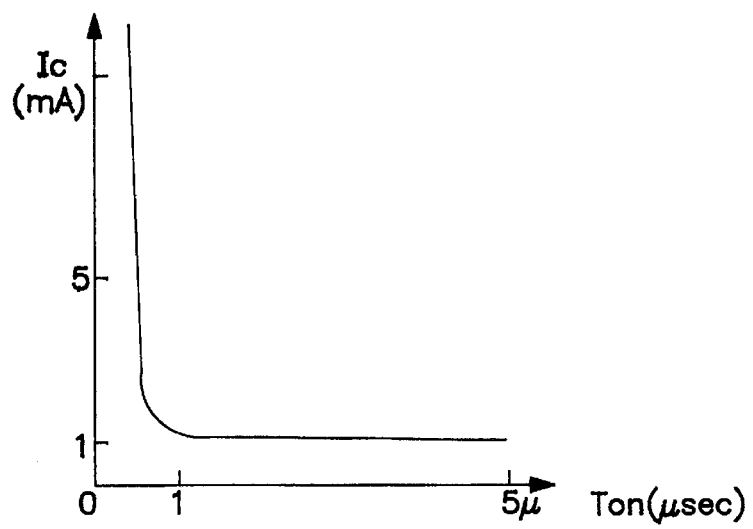
FIG. 3

CONTROLLED DC VOLTAGE STABILIZER

FIELD OF THE INVENTION

The present invention relates to a controlled DC voltage stabilizer to stabilize a secondary dc output voltage by controlling a conductive period of a switching device.

DESCRIPTION OF THE PRIOR ART

Low cost switching regulators are required for numerous applications and a self excitation type having a ringing choke is popular for loads of less than about 150 W.

A block diagram of a controlled dc voltage stabilizer in accordance with the prior art is shown in FIG. 1.

An oscillator 1 generates a rectangular wave by a charging and discharging a capacitor and a resistor. An output of the oscillator 1 makes a switching device 3 execute a switching action through a driver 2. A MOS FET device is usually used as the switching device 3. The switching voltage is transferred from a primary winding 41 of a switching transformer 4 to secondary windings 42, 43 and 44. Secondary dc voltages V1, V2 and V3 are outputted through rectifier circuits 45, 46 and 47, respectively, each of which is composed of a series rectifier and a parallel capacitor. DC output voltage V2 from secondary winding 43 is supplied to an error amplifier 10 and is compared with a reference voltage in error amplifier 10. DC output voltage V3 from secondary winding 44 is also supplied to error amplifier 10 through a diode in a primary side of a photocoupler 11 and a current $I_f$ proportional to the error voltage flows in the diode in the primary side of photocoupler 11. Although the diode in the primary side of photocoupler 11 is supplied with secondary dc output voltage V3 in FIG. 1, another secondary dc output voltage V2 may be supplied instead of V3. Secondary dc output voltage V1 is supplied to the secondary side of photocoupler 11. Error current $I_f$ is amplified at photocoupler 11 and a current $\beta*I_f$ flows in the secondary side of photocoupler 11. Here, $\beta$ is a current transmission factor of photocoupler 11. The current is amplified at a transistor 12 which is Darlington-connected to the secondary side of photocoupler 11 and then charges a capacitor 6. The output current Ic of transistor 12 is expressed by the following equation, $$Ic = h_{fe} * k * \beta * I_f$$

where, $h_{fe}$ is the current amplification factor of transistor 12 and k is the damping coefficient of transistor 12.

When switching device 3 is on, capacitor 7 connected to oscillator 1 is charged at a low voltage (about 0.9 V). Capacitor 6 is charged from about 0 V by a charging current Ic from transistor 12 and when the voltage across capacitor 6 reaches the threshold voltage of oscillator 1, about 0.7 V, oscillator 1 reverses its output polarity and switching device 3 becomes off. At the same time, capacitor 6 is rapidly discharged through a discharging circuit in oscillator 1 and the voltage across capacitor 6 drops to about 0 V.

When switching device 3 is off, the impedance across capacitor 7 is high and capacitor 7 begins to discharge through a resistor 8 connected in parallel. When the voltage across capacitor 7 decreases to about 0.1 V, oscillator 1 reverses its output polarity and turns switching device 3 on. At the same time, capacitor 7 is rapidly charged to about 0.9 V again. By repeating the above actions, the switching device 3 continues the on/off cycle. When the charging current Ic of capacitor 6 becomes large, the charging period becomes short and the period Ton during which the voltage across capacitor 6 reaches the threshold voltage of oscillator 1 becomes short. This is illustrated by the waveforms in FIGS. 2A, 2B and 2C.

A dc voltage V1 obtained from secondary winding 42 of switching transformer 4 is supplied to oscillator 1 and driver 2 through rectifying circuit 45. Resistor 9 is a starting resistor which supplies a voltage to the IC 5 when the controlled dc output stabilizer is turned on. The output voltage is controlled by fixing the non-conductive period Toff and varying the conductive period Ton of switching device 3.

When secondary dc output voltage V2 increases, the primary current of photocoupler 11 increases and the output current Ic of transistor 12 amplified at photocoupler 11 and transistor 12 increases. When the current Ic increases, the charging period of capacitor 6, that is the conductive period of switching device 3 decreases. This causes the supplied energy to the secondary sides of switching transformer 4 to decrease, which decreases the secondary dc output voltages. As a result, increases in the secondary dc output voltages are suppressed which stabilizes the output voltages. A feedback loop which stabilizes the secondary dc output voltages is established.

A relationship between a control current Ic and a conductive period Ton is illustrated in FIG. 3. To shorten the conductive period Ton, the control current Ic must be increased. A light load which requires a conductive period Ton of less than 1 microsecond will require a control current Ic of 7 to 10 mA.

When a controlled dc voltage stabilizer is used in a television receiver, an electronic apparatus such as a video cassette recorder is usually connected to a secondary dc output circuit. The primary side of the switching transformer is connected to an AC line at an apparatus having no power transformer. Therefore, a feedback loop from the secondary side to the primary side of the switching transformer must be isolated somewhere. Photocoupler 11 is used for the isolation.

Oscillator 1 and driver 2 are formed together by an output control IC 5.

In the circuit in accordance with the prior art, however, a transistor 12 which amplifies the feedback current is Darlington-connected to the secondary side of photocoupler 11 and provides a sufficient current Ic for a light load to control the conductive period of the switching device 3. Accordingly, a current amplification factor $h_{fe}*k*\beta$ becomes very large. The circuit has problems because it is easily influenced by environmental temperature and easily generates an abnormal oscillation due to a ripple component in the secondary dc output voltage. These problems arise due to the variation of the current amplification factor caused by a variation of the transistor $h_{fe}$.

SUMMARY OF THE INVENTION

The present invention solves the above mentioned problems and offers a controlled dc voltage stabilizer having a current source circuit for amplifying a feedback current formed in an output control IC. A photocoupler is connected to the output control IC. A current amplification factor is set to an optimum value which obtains stable performance against environmental temperature, and at the same time, prevents an abnormal oscillation of the control circuit by suppressing variations in the current amplification factors.

To stabilize the secondary dc output voltage, an error voltage of the secondary dc output voltage is transformed into a current, amplified and fed back to a primary circuit. A circuit in which the feedback current is amplified is made with an integrated circuit (IC). An optimum current amplification factor can be obtained by forming the circuit that amplifies the feedback current in an IC and combining it with an oscillator and a driver in one output control IC. Thus, variations of the current amplification factors due to environmental temperature, variations of transistor $h_{fe}$, etc. are reduced and abnormal oscillation of the power circuit due to a ripple included in the secondary dc output voltage is prevented. Thus, the controlled dc voltage stabilizer is improved.

A controlled dc voltage stabilizer in accordance with the present invention includes a current source circuit in an output control IC which amplifies a feedback current from a photocoupler to an optimum value, for example, 7 to 10 times. A capacitor for determining a conductive period of a switching device is connected to the current source circuit.

According to the present invention, a stable controlled dc voltage stabilizer can be realized which can obtain any optimum current amplification factor with very little variation by forming the circuit with an IC instead of a Darlington-connected transistor. Stable voltage control is achieved over a wide range of loads. The circuit remains stable even when the environmental temperature varies and prevents an abnormal oscillation of the circuit due to a ripple component in the secondary dc output voltage.

BRIEF DESCRIPTION OF THE DRAWINGS

FIGS. 2A, 2B and 2C illustrate waveforms of a controlled dc voltage stabilizer.

FIG. 3 illustrates a relation between a control current Ic and a conductive period Ton.

DETAILED DESCRIPTION OF THE INVENTION

Figure 1:
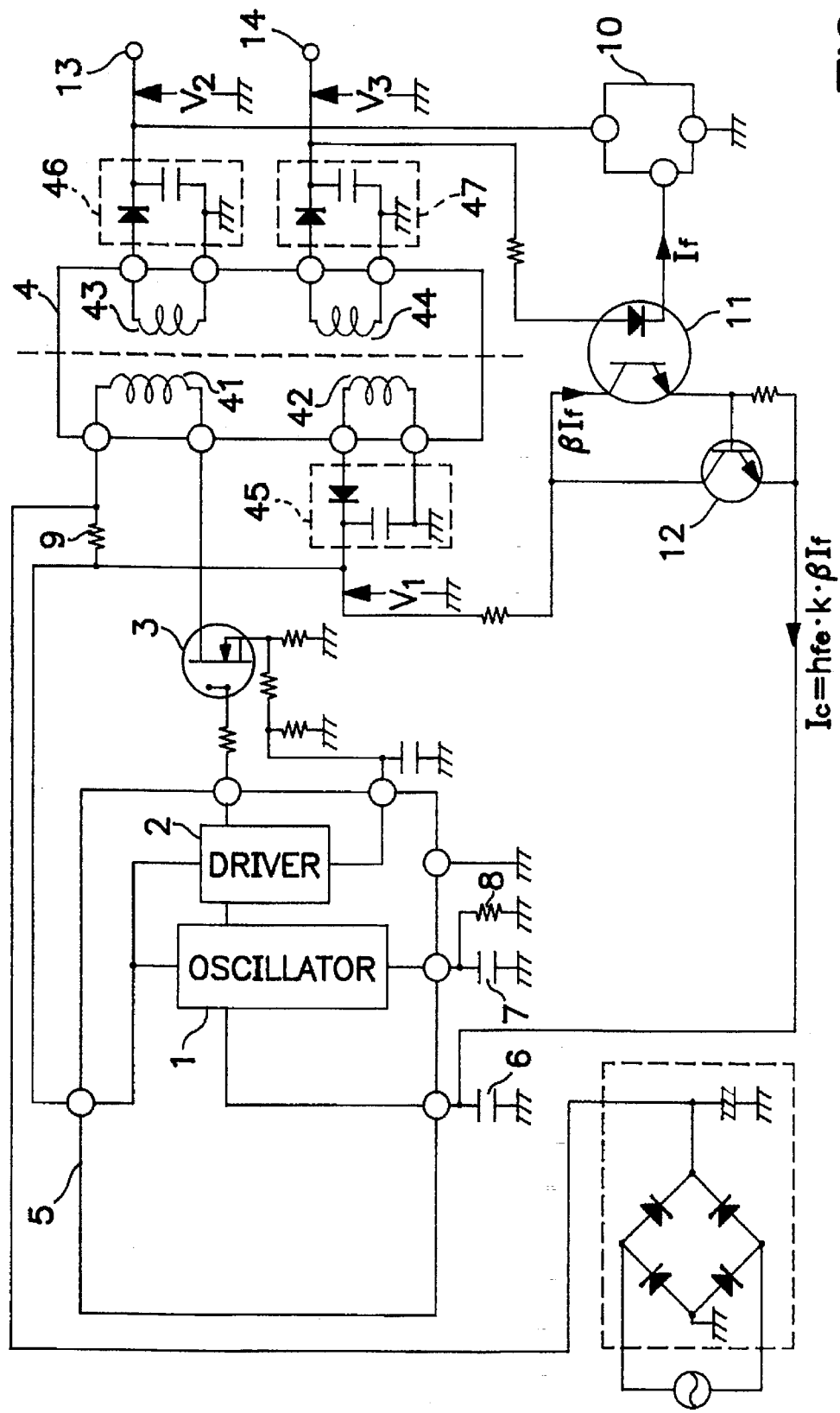
FIG. 1 is a block diagram of a controlled dc voltage stabilizer in accordance with the prior art.
Figure 4:
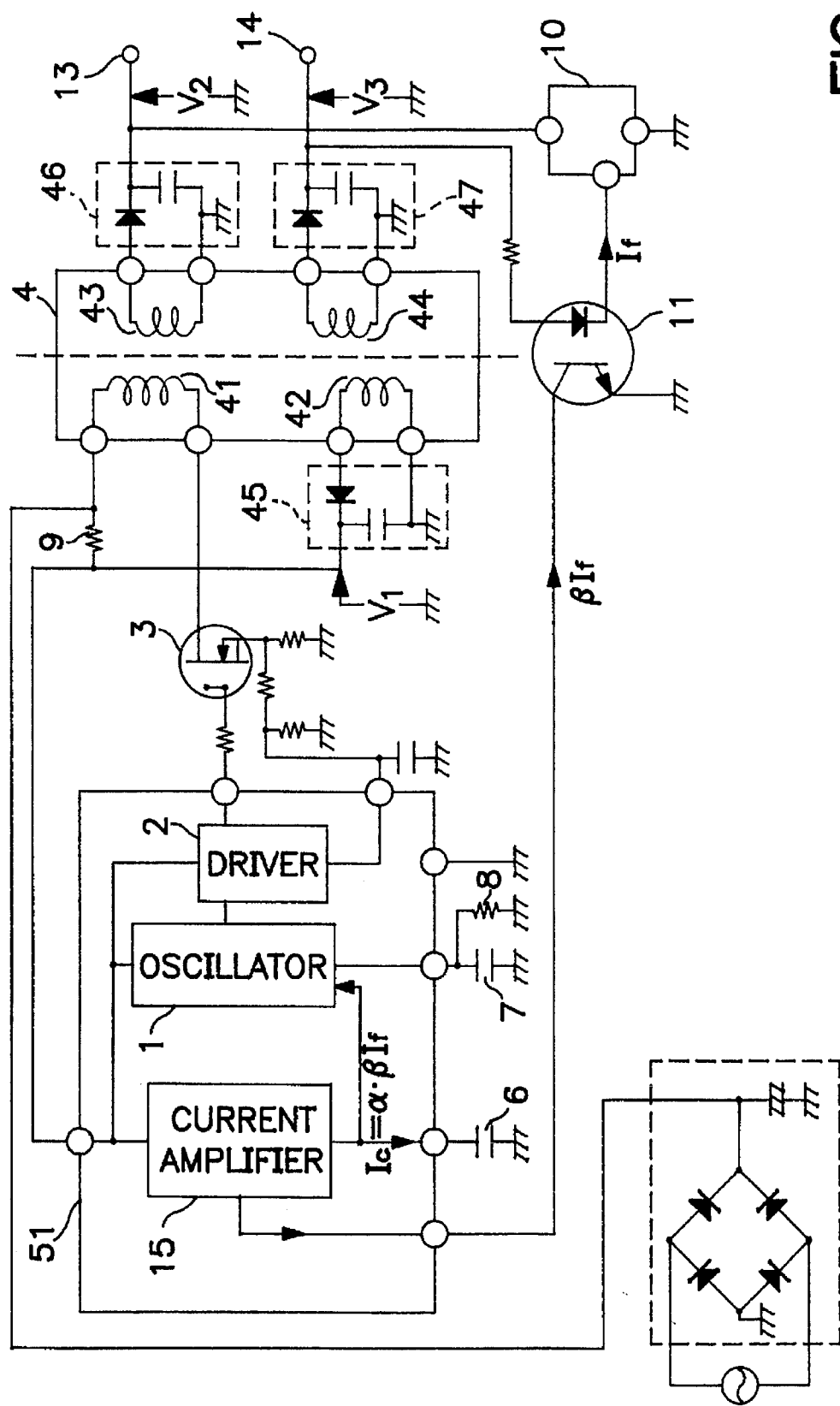
FIG. 4 is a block diagram of a controlled dc voltage stabilizer in accordance with an exemplary embodiment of the present invention.

A block diagram of a controlled dc voltage stabilizer in accordance with an exemplary embodiment of the present invention is shown in FIG. 4. The components having the same function as those shown in FIG. 1 are labeled with the same numbers and their explanations are omitted.

The secondary side of photocoupler 11 is connected to a current amplifier 15. The secondary current of photocoupler 11 is amplified at current amplifier 15 instead of Darlington-connected transistor 12 in the prior art and charges capacitor 6. The operation of the other components are the same as those in the prior art and the descriptions of these components is omitted.

The secondary current $\beta^* I_f$ of photocoupler 11 is amplified by α at current amplifier 15 according to the equation, $$Ic = \alpha^* \beta I_f$$

and Ic charges capacitor 6. Current amplifier 15 is composed of an IC and easily provides a current amplification factor α=7 to 10. Because the current amplification factor of a current mirror circuit is determined by a ratio of the resistance values of two resistors connected to the emitters of two transistors, the influence due to transistor $h_{fe}$, environmental temperature, etc. is very small. Connecting a current mirror circuit and selecting the ratio of the resistance values of the two resistors connected to the emitters of two transistors, a desired value of the current amplification factor is easily obtained without any influence due to transistor $h_{fe}$, environmental temperature, etc. Moreover, a reduction in the size and cost is achieved by making a current amplifier 15 in an IC 51 together with an oscillator 1 and a driver 2.

As described with respect to FIG. 1, error amplifier 10 and the primary side of photocoupler 11 may be connected to the same secondary dc output.

According to an exemplary embodiment of the present invention, it is possible to set an amplification factor of the feedback current to an arbitrary optimum value and a controlled dc voltage stabilizer can be realized which controls the dc output voltages stably over a wide range of loads. The circuit is stable against variations in the environmental temperature, has little variation in the current amplification factor and prevents abnormal oscillations due to a ripple component in the secondary dc output voltage.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalence of the claims are therefore intended to be embraced therein.

What is claimed:

1. A controlled dc voltage stabilizer comprising:

oscillation means for oscillating by charging and discharging of a capacitor;

switching means responsive to an output of said oscillation means;

transformer means including a primary winding connected in series with said switching means across a dc source;

secondary rectifier means connected to a secondary winding of said transformer means for generating a dc output voltage;

error amplifier means for amplifying a difference between the dc output voltage of said secondary rectifier means and a reference voltage and transforming a difference voltage to an error current;

photocoupler means for amplifying the error current produced at said error amplifier means; and current amplifier means composed of a current mirror circuit for amplifying an output current of said photocoupler means; and wherein the dc output voltage of said secondary rectifier means is stabilized by controlling a conductive period of said switching means by means of an output current of said current amplifier means.

2. A controlled dc voltage stabilizer comprising:

oscillation means for oscillating by charging and discharging of a capacitor;

switching means responsive to an output of said oscillation means;

transformer means including a primary winding connected in series with said switching means across a dc source;

secondary rectifier means connected to a secondary winding of said transformer means for generating a dc output voltage;

error amplifier means for amplifying a difference between the dc output voltage of said secondary rectifier means and a reference voltage and transforming a difference voltage to an error current; and current amplifier means composed of a current mirror circuit for amplifying the error current generated at said error amplifier means; wherein the dc output voltage of said secondary rectifier means is stabilized by controlling a conductive period of said switching means by means of an output current of said current amplifier means.

3. A controlled dc voltage stabilizer comprising:

oscillation means for oscillating by charging and discharging of a capacitor;

drive means responsive to the output of said oscillation means, for outputting a drive signal;

switching means being controlled by an output of said drive means;

transformer means including a primary winding connected in series with said switching means across a dc source;

secondary rectifier means connected to a secondary winding of said transformer means for generating a dc output voltage;

error amplifier means for amplifying a difference between the dc output voltage of said secondary rectifier means and a reference voltage and transforming a difference voltage to an error current; and current amplifier means composed of a current mirror circuit for amplifying the error current produced at said error amplifier means; wherein said capacitor is inserted between said oscillation means and said dc source; and the dc output voltage of said secondary rectifier means is stabilized by controlling a conductive period of said switching means by means of an output current of said current amplifier means.

* * * * *